(12) United States Patent
Bhamidipati et al.

(10) Patent No.: US 10,784,807 B2
(45) Date of Patent: Sep. 22, 2020

(54) METHODS AND SYSTEMS FOR CONTROLLING AN ELECTRICAL MACHINE

(71) Applicants: Suryanarayana Bhamidipati, Bangalore (IN); Siraj Issani, Bangalore (IN); Anand Venkatramani, Bangalore (IN)

(72) Inventors: Suryanarayana Bhamidipati, Bangalore (IN); Siraj Issani, Bangalore (IN); Anand Venkatramani, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/975,360

(22) Filed: May 9, 2018

(65) Prior Publication Data
US 2018/0331646 A1    Nov. 15, 2018

(30) Foreign Application Priority Data
May 11, 2017   (IN) .............................. 201731016509

(51) Int. Cl.
*H02P 23/14*   (2006.01)
*G05B 19/04*   (2006.01)
*G05F 1/66*    (2006.01)

(52) U.S. Cl.
CPC .............. *H02P 23/14* (2013.01); *G05B 19/04* (2013.01); *G05F 1/66* (2013.01); *G05B 2219/41327* (2013.01); *H02P 2209/13* (2013.01)

(58) Field of Classification Search
CPC . H02P 21/00; H02P 6/08; H02M 1/12; H02M 5/458; H02M 1/126
See application file for complete search history.

(56) References Cited

U.S. PATENT DOCUMENTS

| | | | |
|---|---|---|---|
| 5,784,236 A * | 7/1998 | Tardiff ..................... | H02H 9/04 361/111 |
| 6,208,537 B1 * | 3/2001 | Skibinski ................ | H02M 1/12 363/40 |
| 6,451,933 B1 * | 9/2002 | Nagy .................... | C08F 4/6592 502/103 |
| 7,245,102 B1 * | 7/2007 | Spong ................... | H02M 5/458 318/632 |

(Continued)

*Primary Examiner* — Rina I Duda
(74) *Attorney, Agent, or Firm* — Lempia Summerfield Katz LLC

(57) ABSTRACT

A method and a parameter estimation system are provided for controlling an electrical machine, (e.g., an induction motor), powered by a drive unit. The method and the parameter estimation system disclosed herein detect a travelling wave generated on a linking element disposed between a first connection point, which is at least one terminal of the electrical machine, and a second connection point, which is at least one terminal of the drive unit. Further, the method and the parameter estimation system disclosed herein obtain at least one of a plurality of wave characteristics associated with the travelling wave, (e.g., an amplitude, a width, a frequency, a travel time of the travelling wave). Further, the method and the parameter estimation system disclosed herein determine one or more control parameters, (e.g., an operational torque and speed), of the electrical machine based on at least one of the wave characteristics.

20 Claims, 6 Drawing Sheets

(56) References Cited

U.S. PATENT DOCUMENTS

| | | | | |
|---|---|---|---|---|
| 7,292,047 B2* | 11/2007 | Tanaka | ............... | H01J 37/32082 |
| | | | | 324/600 |
| 7,489,206 B2* | 2/2009 | Kotani | ............... | H03H 7/40 |
| | | | | 315/111.21 |
| 2012/0139467 A1* | 6/2012 | Suzuki | ............... | H02P 7/29 |
| | | | | 318/472 |
| 2014/0091875 A1* | 4/2014 | Shimomoto | ............... | H03H 7/40 |
| | | | | 333/17.3 |
| 2014/0292382 A1* | 10/2014 | Ogawa | ............... | G01R 31/14 |
| | | | | 327/124 |
| 2015/0002067 A1* | 1/2015 | Nondahl | ............... | H02P 21/00 |
| | | | | 318/503 |
| 2015/0077117 A1* | 3/2015 | Snyder | ............... | H02N 2/0075 |
| | | | | 324/322 |

* cited by examiner (PRIOR ART)

(PRIOR ART)

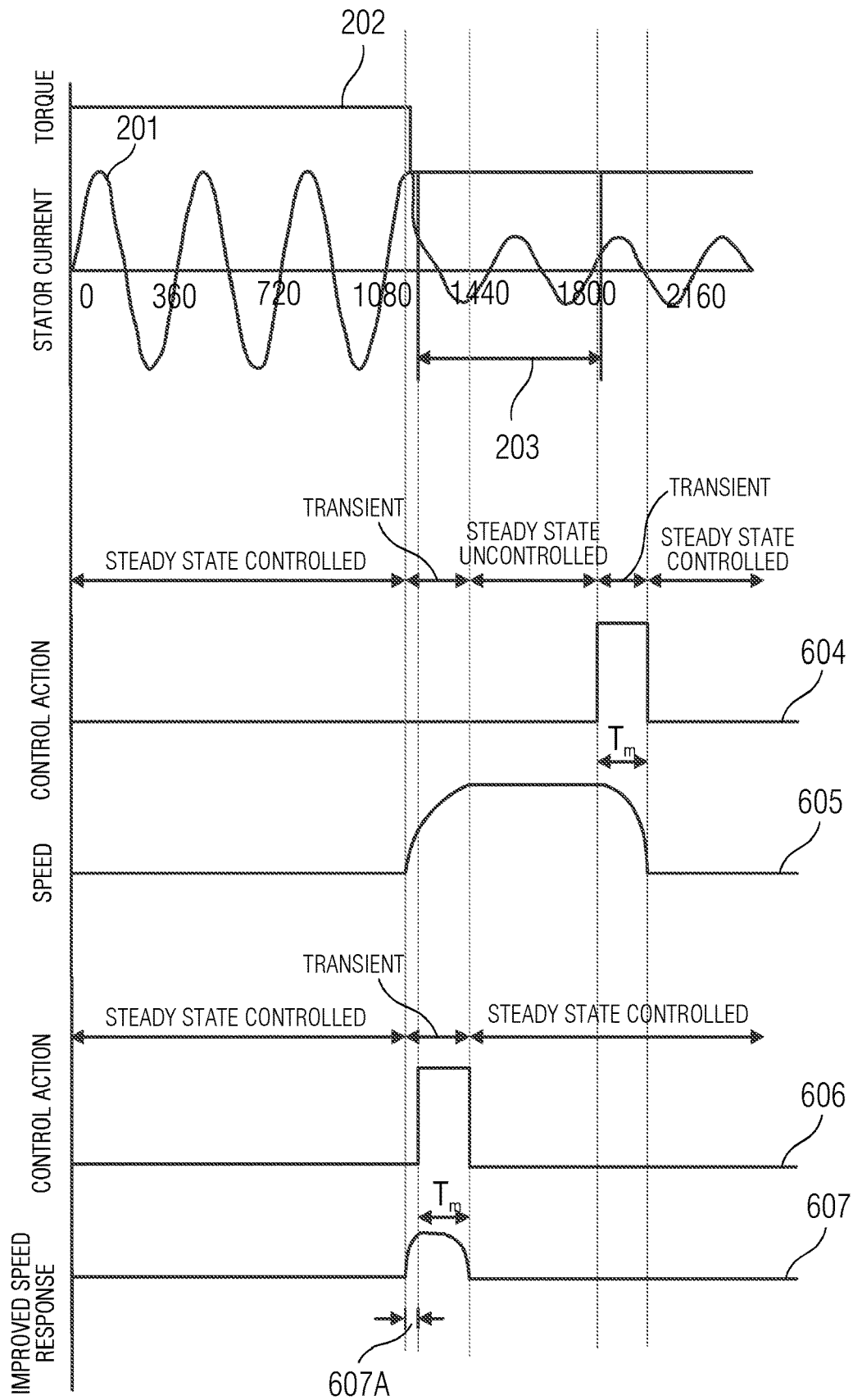

METHODS AND SYSTEMS FOR CONTROLLING AN ELECTRICAL MACHINE

The application claims the benefit of Indian Patent Application No. IN 201731016509, filed May 11, 2017, which is hereby incorporated by reference in its entirety.

BACKGROUND

Electrical machines, (e.g., induction motors), may be used for many applications in which fast response speed control of an induction motor is a requirement. Such fast response speed control demands a high transient performance of a speed control loop, that is, algorithms employed for induction motor control. Conventionally, the induction motor control loop may include a feedback mechanism which senses the current taken by the induction motor and estimates a speed and a torque that needs to be provided by the induction motor. When there is a transient torque change on the shaft of the induction motor, speed instantaneously reduces thereby changing from a desired set point value of an operational speed of the induction motor. The task of the speed control loop is to bring the operational speed back to its desired set point value in the shortest time possible. An increase in the external torque on the rotor increases the rotor current and reduces the rotor speed. This increase in the rotor current induces an increase in the stator current. Such current changes in the rotor and the stator are detected by the speed control loop and the desired current is estimated to bring the speed back to the desired set point value which is then given by the speed control loop to a power system of the induction motor, in order to provide the required current to the induction motor.

Transient performance of an induction motor control may be affected due to three factors. The first factor is based on motor dynamics and internal time constants of the induction motor. This factor is inherent to a motor and cannot be changed due to geometry and electromagnetic interactions between the stator and the rotor of a motor. This factor includes time taken for reflection of speed and torque signature on stator currents. The second factor is based on the speed with which the change in currents may be detected. This factor may depend on the frequency of the stator current waveform being sampled. Conventionally, the current waveform is sampled for its whole cycle because amplitude, frequency, and phase of the current waveforms are important. The third factor includes the time taken for estimating the speed and torque from the acquired signals and actuating signals in order to provide the desired set point value output. This time may be reduced by increasing the speed of the processor thus reducing the processing time.

FIG. 1 depicts a block diagram of Voltage/Frequency (V/F) control system 100, also called a vector control system 100, for controlling an induction motor 101. The induction motor 101 includes a stator 101A and a rotor 101B and is powered by a drive unit 102. The vector control system 100 leverages on modelling the induction motor 101 as a direct current (DC) motor and therefore, maintains flux to an optimal point in order to achieve torque control at an increased speed. For modelling the induction motor 101 as a DC motor, the vector control system 100 performs axes transformation from a rotating 3-phase (a, b, c) to a stationary 2-phase ($\alpha$, $\beta$). One of the two phases ($\alpha$, $\beta$) is then aligned to the flux angle so that torque change may be delivered with an increased speed. The vector control system 100 includes a flux estimation unit 104 and a speed estimation unit 105 which estimate flux and speed from the stator currents, respectively. However, the stator current change is still estimated by sampling a number of cycles of the stator current. This stator current change then reflects in the estimated flux and speed change which are then fed to a Proportional Integral (PI) correction system that an electrical machine control unit 103 employs. Thus, the vector control system 100 leverages on reducing the first component of time by modelling the induction motor 101 as a DC motor and keeps the flux at the optimal value. However, the vector control system 100 relies on detecting stator current change using 'n' number of cycles of the current waveform thereby, affecting speed of detection of the current change.

FIG. 2 depicts a stator current waveform 201 and a torque waveform 202 of an induction motor 101 of FIG. 1. Conventional methods, such as the vector control system 100, for motor control which are based on the second factor of managing the speed at which stator current change is detected, may acquire the stator current waveform 201 in an average form, and sample at least three to four cycles of the acquired current waveform 201. However, considering about three to four cycles of the stator current waveform 201 increases the time 203 taken to detect the change in stator current, thereby, reducing the speed of detection of the change. This delay in stator current change detection significantly impacts the dynamic response of the vector control system 100 because, a change in stator current is responded to after about three to four cycles of the stator current waveform 201 despite of the speed at which the vector control system 201 acquires and/or processes the stator current waveform 201. For example, for an induction motor 101 having a nominal frequency of operation of 50 Hz-60 Hz and a corresponding time period of 16.6 milliseconds (ms)-20 ms, the time 203 taken for detecting a change in the stator current is about four cycles of 20 ms at 50 Hz frequency is about 80 ms. The time 203 taken for the detection is irrespective of the speed at which the vector control system 100 executes the control algorithms.

Another conventional technique used in induction motor control is a sparse sampling technique that estimates the signal from a few given samples of the current waveform. This technique gives an improved performance over the other techniques used for detection of the current by employing an averaging technique. However, the sparse sampling technique includes performing signal estimation based on an average wave shape of the stator current waveform which largely depends on the frequency of the stator current. This dependency in turn affects the speed of detection of the change in stator current at lower frequencies of operation, that is, for slower induction motors the time taken for detection of change in current would be longer.

SUMMARY

The scope of the present disclosure is defined solely by the appended claims and is not affected to any degree by the statements within this description. The present embodiments may obviate one or more of the drawbacks or limitations in the related art.

A method and system for controlling an electrical machine powered by a drive unit is disclosed herein. In one aspect, a method of controlling an electrical machine powered by a drive unit includes detecting a travelling wave generated on a linking element disposed between a first connection point and a second connection point. The first connection point including at least one terminal of the electrical machine and the second connection point including at least one terminal of the drive unit. The method includes obtaining at least one of a plurality of wave characteristics associated with the travelling wave. The method includes determining one or more control parameters of the electrical machine based on at least one of the wave characteristics.

In another aspect, a parameter estimation system for controlling an electrical machine powered by a drive unit, includes a non-transitory computer readable storage medium storing computer program instructions defined by modules of the parameter estimation system, at least one processor communicatively coupled to the non-transitory computer readable storage medium and executing the computer program instructions. The modules of the parameter estimation system include a wave management module and a parameter determination module. The wave management module detects a travelling wave generated on a linking element disposed between a first connection point and a second connection point. The wave management module further obtains at least one of a plurality of wave characteristics associated with the travelling wave. The parameter determination module determines one or more control parameters of the electrical machine based on least one of the wave characteristics.

In yet another aspect, a non-transitory computer-readable storage medium, having instructions stored therein, which when executed by a parameter estimation system, cause the parameter estimation system to perform a method controlling an electrical machine powered by a drive unit.

In yet another aspect, an electrical machine control system is disclosed. The electrical machine control system includes an electrical machine, the parameter estimation system in operable communication with the electrical machine, a drive unit operably connected to and powering the electrical machine via a linking element and an electrical machine control unit operably connected to the parameter estimation system and the drive unit. The electrical machine control unit based on the control parameters determined by the parameter estimation system controls the drive unit powering the electrical machine.

This summary is provided to introduce a selection of concepts in a simplified form that are further described below in the following description. It is not intended to identify features or essential features of the claimed subject matter. Furthermore, the claimed subject matter is not limited to implementations that solve any or all disadvantages noted in any part of this disclosure.

BRIEF DESCRIPTION OF THE VIEWS OF THE DRAWINGS

The foregoing summary, as well as the following detailed description is better understood when read in conjunction with the appended drawings. For the purpose of illustrating, exemplary embodiments are shown in the drawings. However, the exemplary embodiments are not to be considered as limitations to specific methods and systems disclosed herein. The description of a method, act or a system referenced by a numeral in the drawings is applicable to the description of that method, act or the system shown by that same numeral in any subsequent drawing disclosed herein. A more complete appreciation of the present disclosure and many of the attendant aspects thereof will be readily obtained as the same becomes better understood by reference to the following description when considered in connection with the accompanying drawings:

FIG. 6C depicts a comparative graphical representation of a speed response with and without employment of the parameter estimation system of FIG. 4.

DETAILED DESCRIPTION

Figure 1:
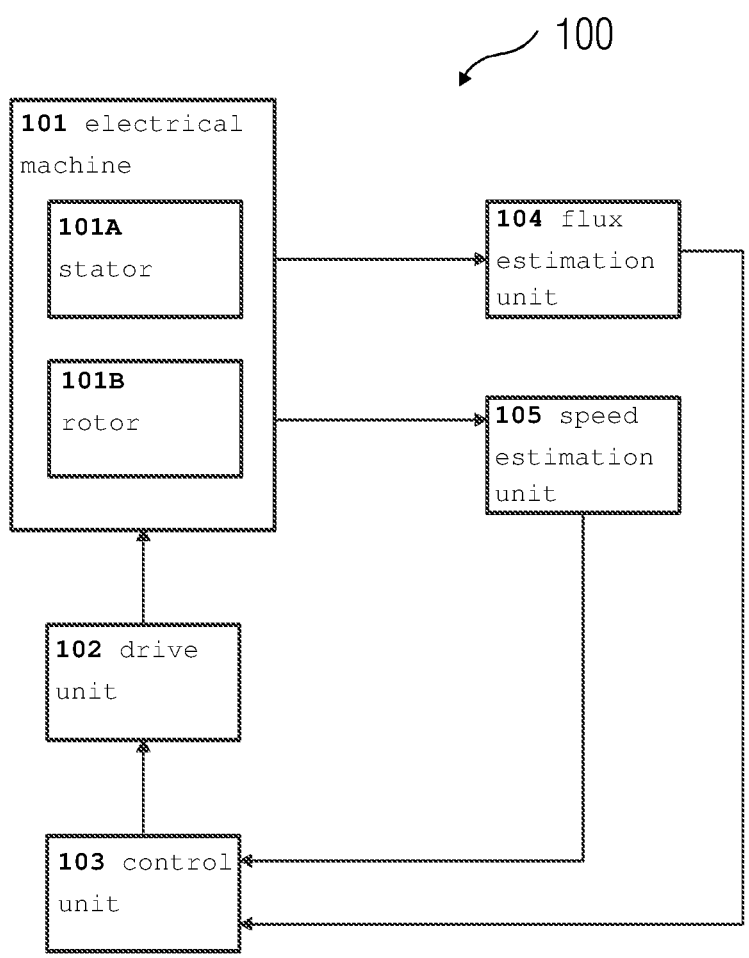
FIG. 1 (prior art) depicts a block diagram of Voltage/Frequency (V/F) control system for controlling an induction motor.
Figure 2:
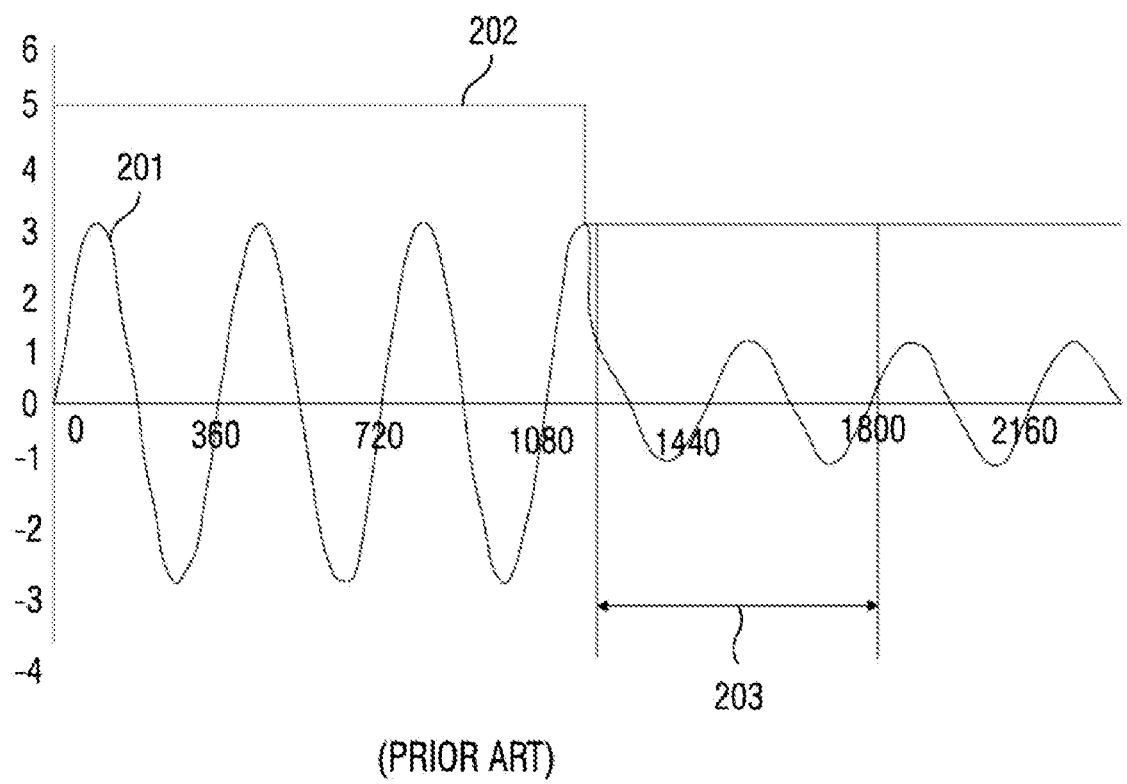
FIG. 2 (prior art) depicts a stator current waveform and a torque waveform of an induction motor of FIG. 1.

A method and system for controlling an electrical machine powered by a drive unit is disclosed. Various embodiments are described with reference to the drawings, wherein like reference numerals are used to refer to like elements throughout. In the following description, numerous specific details are set forth in order to provide a thorough understanding of embodiments of the present disclosure. It will be apparent to one skilled in the art, that these specific details need not be employed to practice embodiments of the present disclosure. In other instances, well known materials or methods have not been described in detail in order to avoid unnecessarily obscuring embodiments of the present disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the present disclosure.

Figure 3:
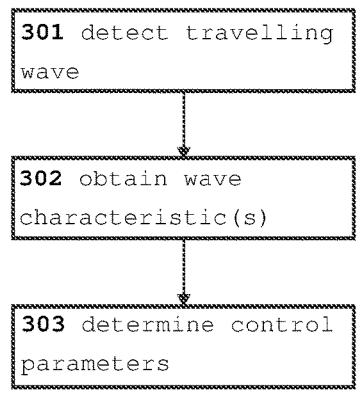
FIG. 3 depicts a process flowchart of an exemplary method of controlling an electrical machine powered by a drive unit, according to an embodiment of the present disclosure.

FIG. 3 depicts a process flowchart of an exemplary method 300 of controlling an electrical machine powered by a drive unit, according to an embodiment of the present disclosure. The electrical machine includes, for example, an electrical motor such as an induction motor, or an electrical generator. For purposes of explanation of the embodiments of the present disclosure, the electrical machine is interchangeably referred to as an electrical motor and/or an induction motor hereafter in the detailed description. However, a scope of protection of the present disclosure is not to be limited by the example embodiments of the electrical machine as a motor with respect to which the detailed description is explained. At act 301, the method includes detecting a travelling wave generated on a linking element disposed between a first connection point and a second connection point. As used herein, "linking element" refers to a connection member operably connecting the electrical machine to the drive unit. The linking element is, for example, a cable acting as a transmission line. The first connection point includes at least one terminal of the electrical machine, that is, the induction motor, and the second connection point includes at least one terminal of the drive unit. When there is a change in torque at an external shaft of the induction motor, there is a step change in rotor current, which in turn, generates a step change in flux linkage. The step change in the flux linkage couples with stator coils of the induction motor thereby, producing a step change. The step change induces a change in the stator current. The step change in stator current gives rise to an impedance mismatch at the first connection point and the second connection point thereby, setting up a travelling wave over the linking element. The travelling wave travels between the first connection terminal and the second connection terminal at a speed approximately equal to the speed of light. The speed of travelling wave is based on dielectric properties of linking element's insulation. For example, a linking element without any insulation has no reduction in speed of travelling wave and reduction in this speed is proportional to an increase in the insulation. The travelling wave travels to and from the connection terminals until the stator current has increased over one cycle of the current waveform. Stator current increases in proportion to an increase in torque demand by a load connected to the electrical machine. Thus, the method includes detecting the travelling wave by monitoring any change in the stator current.

At act 302, the method includes obtaining at least one of a plurality of wave characteristics associated with the travelling wave. In one aspect according to the present disclosure, the method obtains wave characteristics, during a transient state of operation of the electrical machine. According to this aspect, the transient state of operation is a state consecutive to a steady state controlled operation of the electrical machine. That is, before the electrical machine goes into an uncontrolled steady state of operation, the method obtains the wave characteristics. The wave characteristics include an amplitude of the travelling wave, a width of the travelling wave, and/or a frequency of the travelling wave. In another aspect, the wave characteristics may include a travel time that the travelling wave takes to travel on the linking element from the first connection point to the second connection point as well as a reflection time that the travelling wave takes to travel on the linking element from the second connection point to the first connection point. In one aspect according to the present disclosure, the method obtains wave characteristics for each of the travelling waves travelling on the linking element. In this aspect, the method employs averaging techniques, such as weighted average technique, for determining an average of the wave characteristics from multiple travelling waves.

The method obtains the wave characteristics by determining a sampling frequency based on one or more properties of the linking element and a speed of propagation of the travelling wave along the linking element. For example, for a travelling wave traveling on a linking element having a length of "l" meters at a speed of "c" meters per second, the sampling frequency "Fs" Hertz is determined by using the formula given below:

$$Fs=(2c)/l$$

The method further obtains the wave characteristics by sampling at least partially, the travelling wave using the sampling frequency. The method further obtains the wave characteristics by analyzing one or more samples of the travelling wave sampled at the sampling frequency, for obtaining the wave characteristics. In one aspect according to the present disclosure, the wave characteristics are stored in a database.

At act 303, the method includes determining one or more control parameters of the electrical machine based on at least one of the wave characteristics. The control parameters of the electrical machine include a control action associated with the electrical machine. The control action includes, for example, an operational speed of the electrical machine, an operational torque of the electrical machine, and/or an operational power of the electrical machine. The control parameters are a function of one or more of the wave characteristics associated with the travelling wave. The method determines the control parameters, for example, a change in output torque that may result due to a load change on the electrical machine, based on an amplitude of each of the travelling waves, a number of travelling waves, and/or a width of each travelling wave. For example, an amplitude of the travelling wave, at a transient state, is proportional to the change in the output torque that will take place. Thus, by determining amplitude of the travelling wave, a change in torque may be estimated in advance, that is, before the torque actually changes in a steady state uncontrolled operation of the electrical machine, as a result of its load change. In another example, a number of travelling waves set up on the linking element is in proportion to the change in torque, that is, the number of travelling waves set up prior to the stator current reaching its steady state uncontrolled operation are in direct proportion to the change in torque that will take place in the steady state uncontrolled operation. In yet another example, by determining a width of the travelling wave robustness of the control parameter estimation may be determined, that is, the width gives a confirmation regarding inputs used for control parameter estimation, for example, cable parasitic elements, motor parasitic elements, and induction motor parameters. The method disclosed herein in its acts 301, 302, and 303 achieves a predictive control of the electrical machine by estimating in advance the control action required, based on the wave characteristics obtained.

Figure 4:
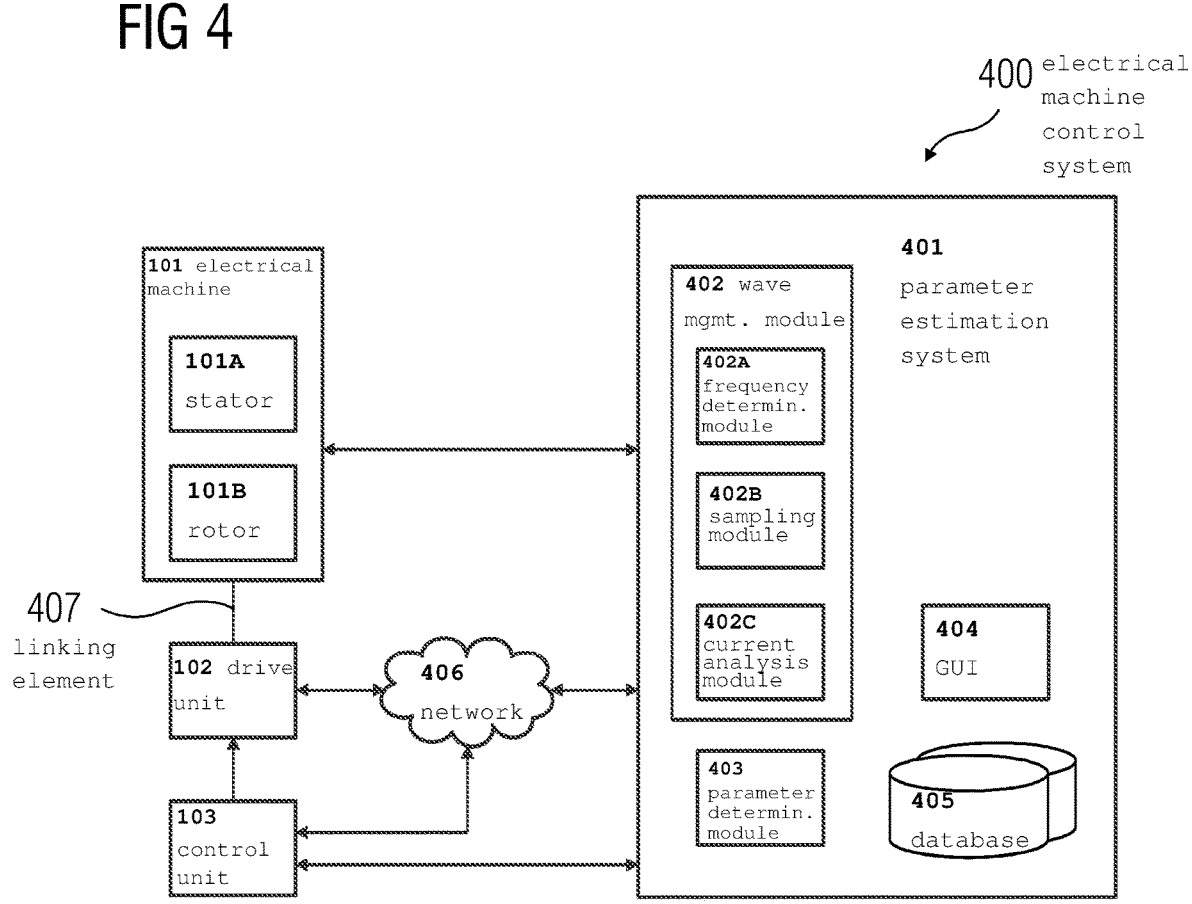
FIG. 4 depicts a block diagram of an electrical machine control system including a parameter estimation system for controlling an electrical machine powered by a drive unit, according to an embodiment of the present disclosure.

FIG. 4 depicts a block diagram of an electrical machine control system 400 including a parameter estimation system 401 for controlling an electrical machine 101 powered by a drive unit 102, according to an embodiment of the present disclosure. The electrical machine control system 400 includes an electrical machine 101, the parameter estimation system 401 in operable communication with the electrical machine 101, a drive unit 102 operably connected to and powering the electrical machine 101, via a linking element 407 such as a cable, and an electrical machine control unit 103 operably connected to the parameter estimation system 401 and the drive unit 102. The electrical machine 101 is, for example, an induction motor having a stator 101A and a rotor 101B. In one aspect according to the present disclosure, the parameter estimation system 401 is in communication with the drive unit 102 and the electrical machine control unit 103 via a communication network 406. The communication network 406 is, for example, a wired network, a wireless network, or a network formed from any combination of these networks. The communication network 406 is, for example, a plant bus, a field bus, a communication bus, etc.

The parameter estimation system 401 disclosed herein includes a non-transitory computer readable storage medium and at least one processor communicatively coupled to the non-transitory computer readable storage medium. As used herein, "non-transitory computer readable storage medium" refers to computer readable media, for example, non-volatile media, volatile media, and transmission media except for a transitory, propagating signal. The non-transitory computer readable storage medium is configured to store computer program instructions defined by modules 402 and 403 of the parameter estimation system 401. The processor is configured to execute the defined computer program instructions. As illustrated in FIG. 4, the parameter estimation system 401 includes a graphical user interface (GUI) 404. A user of a user device on which the parameter estimation system 401 is downloadable, may access the parameter estimation system 401 via the GUI 404. The GUI 404 is, for example, an online web interface, a web based downloadable application interface such as Microsoft® Windows® application, etc. The parameter estimation system 401 further includes a wave management module 402 and a parameter determination module 403.

The wave management module 402 detects a travelling wave generated on the linking element 407 disposed between a first connection point, that is, at least one terminal of the electrical machine 101, and a second connection point, that is, at least one terminal of the drive unit 102. The wave management module 402 further obtains at least one of a plurality of wave characteristics associated with the travelling wave. The wave characteristics include an amplitude of the travelling wave, a width of the travelling wave, and a frequency of the travelling wave. The wave management module 402 includes a frequency determination module 402A, a sampling module 402B, and a current analysis module 402C. The frequency determination module 402A determines a sampling frequency based on one or more properties of the linking element 407 and a speed of propagation of the travelling wave along the linking element 407. The sampling module 402B samples at least partially, the travelling wave using the sampling frequency. The current analysis module 402C analyzes one or more samples of the travelling wave for obtaining the wave characteristics. In one aspect according to the present disclosure, the wave management module 402 stores the wave characteristics in a control system database 405. The control system database 405 is, for example, a structured query language (SQL) data store or a not only SQL (NoSQL) data store. In one aspect according to the present disclosure, the control system database 405 may also be a location on a file system directly accessible by the parameter estimation system 401. In another aspect according to the present disclosure, the control system database 405 is configured as cloud-based database implemented in a cloud computing environment, where computing resources are delivered as a service over the communication network 406. As used herein, "cloud computing environment" refers to a processing environment including configurable computing physical and logical resources, for example, networks, servers, storage, applications, services, etc., and data distributed over the communication network 406, (e.g., the internet). The cloud computing environment provides on-demand network access to a shared pool of the configurable computing physical and logical resources.

The parameter determination module 403 determines one or more control parameters of the electrical machine 101 based on at least one of the wave characteristics. The control parameters of the electrical machine 101 include a control action associated with the electrical machine 101. The parameter determination module 403 in operable communication with the electrical machine control unit 103 controls the drive unit 102 powering the electrical machine 101 based on the control parameters. For example, the electrical machine control unit 103, based on the control parameters that the parameter estimation system 401 determines, controls, that is, generates and applies a voltage to the drive unit 102 powering the electrical machine 101.

Thus, when the frequency of operation of the electrical machine 101 (such as the induction motor) changes, the step changes in the stator current still cause an impedance mismatch on the linking element. Therefore, the travelling waves are present on the linking element 407 irrespective of the frequency of operation of the electrical machine 101. Thus, the method and the system disclosed herein detect change in the stator current independent of frequency of operation of the electrical machine 101. Thus, for an electrical machine 101 such as an induction motor, the method and the system disclosed herein reduce detection time of a torque change by sensing the travelling waves setup on the linking element due to change in induction motor currents wherein the setting up of the travelling wave is independent of the operating frequency thereby, improving overall transient response associated with control of the induction motor.

Figure 5:
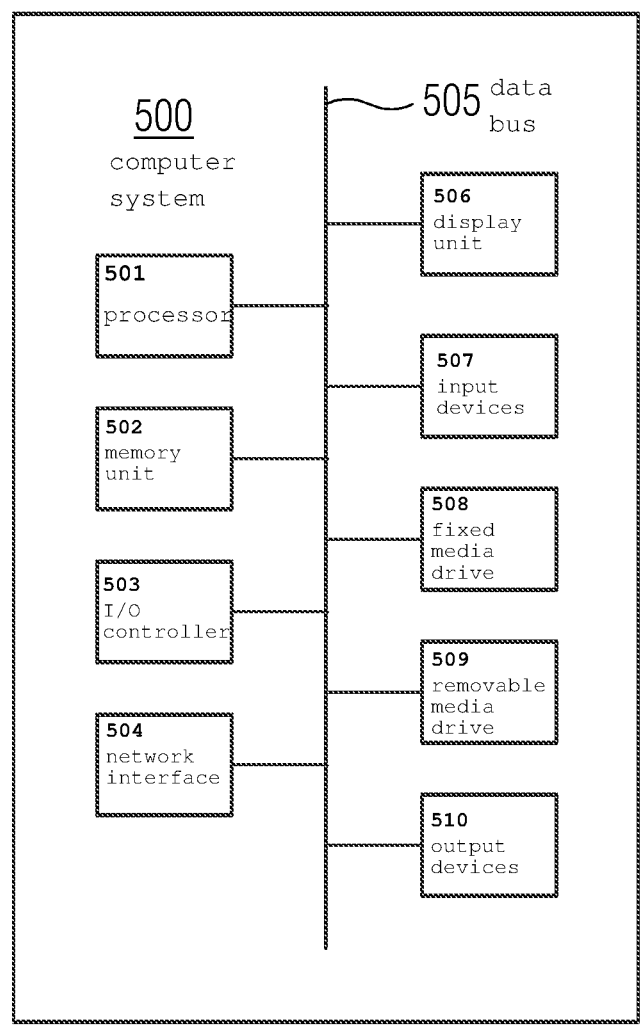
FIG. 5 depicts a block diagram illustrating architecture of a computer system employed by the parameter estimation system of FIG. 4 for controlling an electrical machine powered by a drive unit.

FIG. 5 depicts a block diagram illustrating architecture of a computer system 500 employed by the parameter estimation system 401 of FIG. 4 for controlling an electrical machine 101 powered by a drive unit 102. The parameter estimation system 401 employs the architecture of the computer system 500 illustrated in FIG. 5. The computer system 500 is programmable using a high-level computer programming language. The computer system 500 may be implemented using programmed and purposeful hardware. As illustrated in FIG. 5, the computer system 500 includes a processor 501, a non-transitory computer readable storage medium such as a memory unit 502 for storing programs and data, an input/output (I/O) controller 503, a network interface 504, a data bus 505, a display unit 506, input devices 507, a fixed media drive 508 such as a hard drive, a removable media drive 509 for receiving removable media, output devices 510, etc. The processor 501 refers to any one of microprocessors, central processing unit (CPU) devices, finite state machines, microcontrollers, digital signal processors, an application specific integrated circuit (ASIC), a field-programmable gate array (FPGA), etc., or any combination thereof, capable of executing computer programs or a series of commands, instructions, or state transitions. The processor 501 may also be implemented as a processor set including, for example, a general-purpose microprocessor and a math or graphics co-processor. The processor 501 is selected, for example, from the Intel® processors, Advanced Micro Devices (AMD®) processors, International Business Machines (IBM®) processors, etc. The parameter estimation system 401 disclosed herein is not limited to a computer system 500 employing a processor 501. The computer system 500 may also employ a controller or a microcontroller. The processor 501 executes the modules, for example, 402, 403, etc., of the parameter estimation system 401.

The memory unit 502 is used for storing programs, applications, and data. For example, the wave management module 402, the parameter determination module 403, etc., of the parameter estimation system 401 are stored in the memory unit 502 of the computer system 500. The memory unit 502 is, for example, a random-access memory (RAM) or another type of dynamic storage device that stores information and instructions for execution by the processor 501. The memory unit 502 also stores temporary variables and other intermediate information used during execution of the instructions by the processor 501. The computer system 500 further includes a read only memory (ROM) or another type of static storage device that stores static information and instructions for the processor 501. The I/O controller 503 controls input actions and output actions performed by the parameter estimation system 401.

The network interface 504 enables connection of the computer system 500 to the communication network 406. For example, the parameter estimation system 401 connects to the communication network 406 via the network interface 504. In an embodiment, the network interface 504 is provided as an interface card also referred to as a line card. The network interface 504 includes, for example, interfaces using serial protocols, interfaces using parallel protocols, and Ethernet communication interfaces, interfaces based on wireless communications technology such as satellite technology, radio frequency (RF) technology, near field communication, etc. The data bus 505 permits communications between the modules, for example, 402, 403, 404, etc., of parameter estimation system 401.

The display unit 506, via the graphical user interface (GUI) 405, displays information such as the control parameters including operation torque and operational speed, user interface elements such as text fields, buttons, windows, etc. The display unit 506 includes, for example, a liquid crystal display, a plasma display, an organic light emitting diode (OLED) based display, etc. The input devices 507 are used for inputting data into the computer system 500. The input devices 507 are, for example, a keyboard such as an alphanumeric keyboard, a touch sensitive display device, and/or any device capable of sensing a tactile input.

Computer applications and programs are used for operating the computer system 500. The programs are loaded onto the fixed media drive 508 and into the memory unit 502 of the computer system 500 via the removable media drive 509. In an embodiment, the computer applications and programs may be loaded directly via the communication network 406. Computer applications and programs are executed by double clicking a related icon displayed on the display unit 506 using one of the input devices 507. The output devices 510 output the results of operations performed by the parameter estimation system 401. For example, the parameter estimation system 401 provides graphical representation of the control parameters, using the output devices 510. The graphical representation includes, for example, overview of ranges of operational torque and operation speed in which an induction motor may operate.

The processor 501 executes an operating system, for example, the Linux® operating system, the Unix® operating system, any version of the Microsoft® Windows® operating system, the Mac OS of Apple Inc., the IBM® OS/2, etc. The computer system 500 employs the operating system for performing multiple tasks. The operating system is responsible for management and coordination of activities and sharing of resources of the computer system 500. The operating system further manages security of the computer system 500, peripheral devices connected to the computer system 500, and network connections. The operating system employed on the computer system 500 recognizes, for example, inputs provided by the users using one of the input devices 507, the output display, files, and directories stored locally on the fixed media drive 508. The operating system on the computer system 500 executes different programs using the processor 501. The processor 501 and the operating system together define a computer platform for which application programs in high level programming languages are written.

The processor 501 of the computer system 500 employed by the parameter estimation system 401 retrieves instructions defined by the wave management module 402, the parameter determination module 402, etc., of the parameter estimation system 401 for performing respective functions disclosed in the detailed description of FIG. 4. The processor 501 retrieves instructions for executing the modules, for example, 402, 403, etc., of the parameter estimation system 401 from the memory unit 502. A program counter determines the location of the instructions in the memory unit 502. The program counter stores a number that identifies the current position in the program of each of the modules, for example, 402, 403, etc., of the parameter estimation system 401. The instructions fetched by the processor 501 from the memory unit 502 after being processed are decoded. The instructions are stored in an instruction register in the processor 501. After processing and decoding, the processor 501 executes the instructions, thereby performing one or more processes defined by those instructions.

At the time of execution, the instructions stored in the instruction register are examined to determine the operations to be performed. The processor 501 then performs the specified operations. The operations include arithmetic operations and logic operations. The operating system performs multiple routines for performing a number of tasks required to assign the input devices 507, the output devices 510, and memory for execution of the modules, for example, 402, 403, 404, etc., of the parameter estimation system 401. The tasks performed by the operating system include, for example, assigning memory to the modules, for example, 402, 403, 404, etc., of the parameter estimation system 401, and to data used by the parameter estimation system 401, moving data between the memory unit 502 and disk units, and handling input/output operations. The operating system performs the tasks on request by the operations and after performing the tasks, the operating system transfers the execution control back to the processor 501. The processor 501 continues the execution to obtain one or more outputs. The outputs of the execution of the modules, for example, 402, 403, 404, etc., of the parameter estimation system 401 are displayed on the GUI 405.

For purposes of illustration, the detailed description refers to the parameter estimation system 401 being run locally on the computer system 500; however the scope of the present disclosure is not limited to the parameter estimation system 401 being run locally on the computer system 500 via the operating system and the processor 501, but may be extended to run remotely over the communication network 406 by employing a web browser and a remote server, a handheld device, or other electronic devices. One or more portions of the computer system 500 may be distributed across one or more computer systems (not shown) coupled to the communication network 406.

Figure 6B:
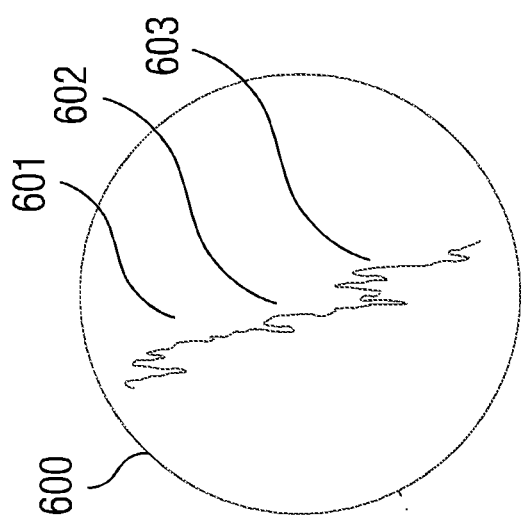
FIG. 6B depicts an enlarged view of a portion of the stator current waveform marked "A" in FIG. 6A, illustrating a travelling waveform.
Figure 6A:
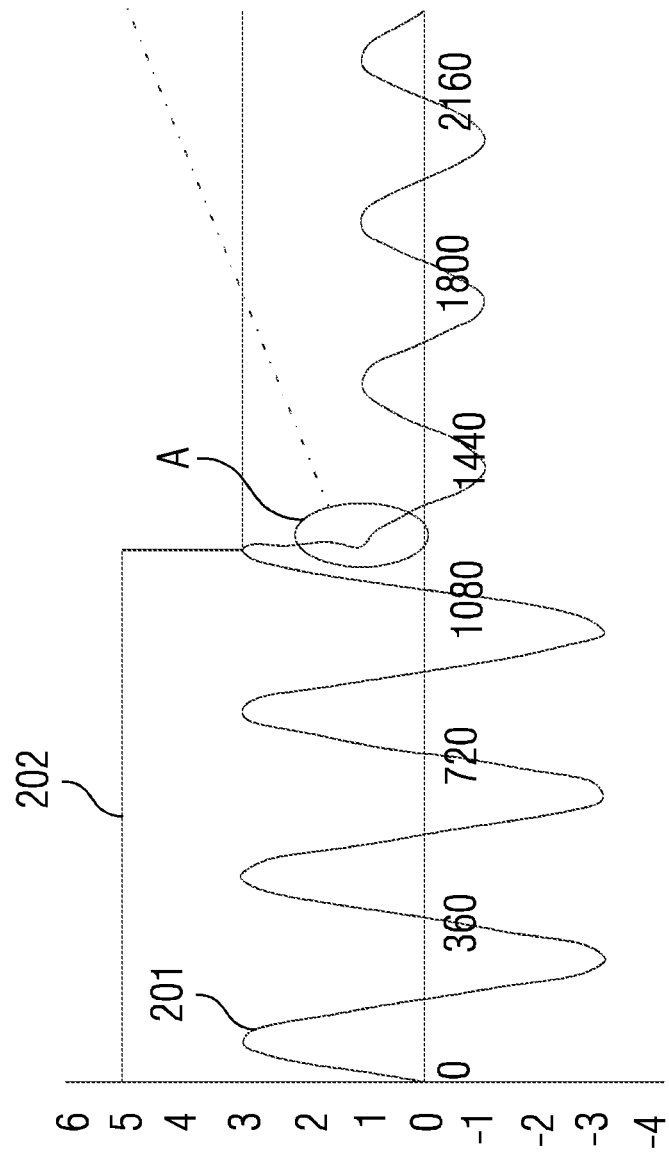
FIG. 6A depicts a stator current waveform and a torque waveform of an electrical machine of FIG. 4.

FIG. 6A depicts a stator current waveform 201 and a torque waveform 202 of an electrical machine 101 such as an induction motor 101 of FIG. 4. At the portion marked "A" on the stator current waveform 201, the impedance mismatch at the terminals of the induction motor has occurred due to which a travelling waveform including one or more travelling waves is generated on the linking element 407 illustrated in FIG. 4. FIG. 6B depicts an enlarged view of a portion of the stator current waveform 201 marked "A" in FIG. 6A, illustrating a travelling waveform 600. The travelling waveform 600 includes travelling waves 601, 602, 603, etc., that are travelling between the first connection point of the induction motor and the second connection point of the drive unit. The method and the system disclosed herein obtain the wave characteristics associated with each of the travelling waves 601, 602, and 603 and determine control parameters, that is, control action in form of an operational torque, an operational speed, or an operational power associated with the transient response control of the induction motor based on the wave characteristics.

FIG. 6C depicts a comparative graphical representation of a speed response with and without employment of the parameter estimation system 401 of FIG. 4. FIG. 6C depicts a stator current waveform 201 and a torque waveform 202 of an electrical machine 101 such as an induction motor, in its various states of operation including, for example, a steady state controlled operation, a transient operation where the torque change happens, a steady state uncontrolled operation when the electrical machine 101 is in operation without the parameter estimation system 401, and a steady state controlled operation where the electrical machine 101 regains its rated operational speed. Post occurrence of a step change in the torque of the electrical machine 101, the electrical machine 101 takes time 203 to detect the change in the stator current and apply a control action for a time period $T_m$ as depicted by the control action waveform 604, wherein $T_m$ is dependent on the parasitic elements of electrical machine 101. Application of the control action brings back the electrical machine 101 to its rated operational speed, as depicted by the speed waveform 605, that is, to its steady state controlled state of operation. The waveforms 604 and 605 represent operation of an electrical machine 101 working without employment of the parameter estimation system 401, thereby, requiring the electrical machine 101 at least two to three cycles of the stator current waveform 201 in order to arrive at a steady state controlled operation.

However, when the parameter estimation system 401 is employed in an operable communication with the electrical machine 101, the parameter estimation system 401 obtains the wave characteristics and determines the control parameters, that is, speed control action, based on the travelling waves (601, 602, and 603) depicted in FIG. 6B, during the transient state. The parameter estimation system 401 together with the electrical machine control unit 103 and the drive unit 102, then initiates a control action, as depicted in control action waveform 606, before allowing the electrical machine 101 to enter into a steady state uncontrolled operation, thereby, improving the speed response, as depicted in the speed waveform 607, within a time 607A from the occurrence of a step change in the torque. This improvement in the stator current change detection enhances overall dynamic response of the electrical machine 101 leading to an improved operational stability of the electrical machine 101.

The foregoing examples have been provided merely for the purpose of explanation and are in no way to be construed as limiting of the present disclosure. While the present disclosure has been described with reference to various embodiments, it is understood that the words, which have been used herein, are words of description and illustration, rather than words of limitation. Further, although the present disclosure has been described herein with reference to particular means, materials, and embodiments, the present disclosure is not intended to be limited to the particulars disclosed herein; rather, the present disclosure extends to all functionally equivalent structures, methods and uses, such as are within the scope of the appended claims. Those skilled in the art, having the benefit of the teachings of this specification, may affect numerous modifications thereto and changes may be made without departing from the scope and spirit of the present disclosure in its aspects.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method of controlling an electrical machine powered by a drive unit, the method comprising:
  detecting a travelling wave generated on a linking element that provides a link between a first connection point and a second connection point by monitoring a change in a stator current of the electrical machine, wherein the first connection point comprises at least one terminal of the electrical machine and the second connection point comprises at least one terminal of the drive unit, wherein there is an impedance mismatch on the linking element, and wherein a step change in the stator current gives rise to the impedance mismatch;
  obtaining at least one wave characteristic of a plurality of wave characteristics associated with the travelling wave; and
  determining one or more control parameters of the electrical machine based on the at least one wave characteristic.

2. The method of claim 1, wherein the at least one wave characteristic comprises an amplitude of the travelling wave, a width of the travelling wave, a frequency of the travelling wave, or a combination thereof.

3. The method of claim 2, wherein the obtaining of the at least one wave characteristic comprises:
  determining a sampling frequency based on one or more properties of the linking element and a speed of propagation of the travelling wave along the linking element;
  sampling, at least partially, the travelling wave using the sampling frequency; and
  analyzing one or more samples of the travelling wave for obtaining the at least one wave characteristic.

4. The method of claim 3, wherein the control parameters are a function of one or more of the plurality of wave characteristics associated with the travelling wave.

5. The method of claim 1, wherein the obtaining of the at least one wave characteristic comprises:
  determining a sampling frequency based on one or more properties of the linking element and a speed of propagation of the travelling wave along the linking element;
  sampling, at least partially, the travelling wave using the sampling frequency; and
  analyzing one or more samples of the travelling wave for obtaining the at least one wave characteristic.

6. The method of claim 1, wherein the control parameters of the electrical machine comprise a control action associated with the electrical machine,
  wherein the control action comprises an operational speed of the electrical machine, an operational torque of the electrical machine, an operational power of the electrical machine, or a combination thereof.

7. The method of claim 1, wherein the control parameters are a function of one or more of the plurality of wave characteristics associated with the travelling wave.

8. The method of claim 1, wherein the at least one wave characteristic is obtained during a transient state of operation of the electrical machine.

9. The method of claim 1, wherein the linking element is a cable functioning as a transmission line.

10. The method of claim 1, wherein the electrical machine is an induction motor.

11. The method of claim 10, wherein the detection of the traveling wave is performed independent of a frequency of operation of the induction motor.

12. The method of claim 1, wherein the detection of the traveling wave is performed independent of a frequency of operation of the electrical machine.

13. A parameter estimation system for controlling an electrical machine powered by a drive unit, the parameter estimation system comprising:
- a non-transitory computer readable storage medium storing computer program instructions defined by modules of the parameter estimation system;
- at least one processor communicatively coupled to the non-transitory computer readable storage medium, the at least one processor configured to execute the defined computer program instructions; and
- the modules of the parameter estimation system comprising:
  - a wave management module configured to: (1) detect a travelling wave generated on a linking element that provides a link between a first connection point and a second connection point by monitoring a change in a stator current of the electrical machine, wherein the first connection point comprises at least one terminal of the electrical machine and the second connection point comprises at least one terminal of the drive unit, wherein there is an impedance mismatch on the linking element, and wherein a step change in the stator current gives rise to the impedance mismatch, and (2) obtain at least one wave characteristic of a plurality of wave characteristics associated with the travelling wave, wherein the at least one wave characteristic comprises an amplitude of the travelling wave, a width of the travelling wave, a frequency of the travelling wave, or a combination thereof; and
  - a parameter determination module configured to determine one or more control parameters of the electrical machine based on the at least one wave characteristic, wherein the control parameters of the electrical machine comprise a control action associated with the electrical machine.

14. The parameter estimation system of claim 13, wherein the wave management module comprises:
- a frequency determination module configured to determine a sampling frequency based on one or more properties of the linking element and a speed of propagation of the travelling wave along the linking element;
- a sampling module configured to at least partially sample the travelling wave using the sampling frequency; and
- a current analysis module configured to analyze one or more samples of the travelling wave for obtaining the at least one wave characteristic.

15. The parameter estimation system of claim 14, wherein the parameter determination module is in operable communication with an electrical machine control unit, and
wherein the electrical machine control unit is configured to control the drive unit powering the electrical machine based on the control parameters.

16. The parameter estimation system of claim 13, wherein the parameter determination module is in operable communication with an electrical machine control unit, and
wherein the electrical machine control unit is configured to control the drive unit powering the electrical machine based on the control parameters.

17. An electrical machine control system comprising:
an electrical machine;
a drive unit operably connected to the electrical machine via a linking element, wherein the drive unit is configured to power the electrical machine;
a parameter estimation system in operable communication with the electrical machine; and
an electrical machine control unit operably connected to the parameter estimation system and the drive unit, wherein the electrical machine control unit, based on control parameters determined by the parameter estimation system, is configured to control the drive unit powering the electrical machine,
wherein the parameter estimation system is configured to:
  detect a travelling wave generated on the linking element that provides a link between at least one terminal of the electrical machine and at least one terminal of the drive unit by monitoring a change in a stator current of the electrical machine, wherein there is an impedance mismatch on the linking element, and wherein a step change in the stator current gives rise to the impedance mismatch;
  obtain at least one wave characteristic of a plurality of wave characteristics associated with the travelling wave; and
  determine one or more control parameters of the electrical machine based on the at least one wave characteristic, wherein the control parameters of the electrical machine comprise a control action associated with the electrical machine.

18. The electrical machine control system of claim 17, wherein the electrical machine is an induction motor.

19. The electrical machine control system of claim 18, wherein the detection of the traveling wave is performed independent of a frequency of operation of the induction motor.

20. The electrical machine control system of claim 17, wherein the detection of the traveling wave is performed independent of a frequency of operation of the electrical machine.

* * * * *